(12) United States Patent
Terrovitis

(10) Patent No.: US 8,099,062 B1
(45) Date of Patent: Jan. 17, 2012

(54) CMOS TRANSCEIVER ANALOG FRONT END HAVING A COMBINED POWER AMPLIFIER AND LOW NOISE AMPLIFIER

(75) Inventor: Manolis Terrovitis, Berkeley, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 937 days.

(21) Appl. No.: 12/109,268

(22) Filed: Apr. 24, 2008

(51) Int. Cl.
*H04B 1/40* (2006.01)

(52) U.S. Cl. .......................... 455/84; 455/73

(58) Field of Classification Search .............. 455/73, 455/78, 83, 84
See application file for complete search history.

(56) References Cited

U.S. PATENT DOCUMENTS

| | | | | |
|---|---|---|---|---|
| 5,144,324 | A * | 9/1992 | Chin et al. ..................... | 343/702 |
| 5,778,306 | A * | 7/1998 | Kommrusch ..................... | 455/78 |
| 6,459,885 | B1 * | 10/2002 | Burgess ..................... | 455/83 |
| 6,510,309 | B1 * | 1/2003 | Thompson et al. ............. | 455/78 |
| 6,937,845 | B2 * | 8/2005 | Watanabe et al. ............... | 455/83 |
| 6,957,047 | B1 * | 10/2005 | Young et al. ..................... | 455/83 |
| 6,980,776 | B2 * | 12/2005 | Shimada et al. ................ | 455/83 |
| 7,065,327 | B1 * | 6/2006 | Macnally et al. .............. | 455/78 |
| 7,209,727 | B2 * | 4/2007 | Castaneda et al. ............ | 455/341 |
| 7,822,389 | B2 * | 10/2010 | Muhammad et al. ........... | 455/78 |
| 2006/0035602 | A1 * | 2/2006 | Young et al. ..................... | 455/83 |
| 2007/0232241 | A1 * | 10/2007 | Carley et al. ..................... | 455/83 |

\* cited by examiner

*Primary Examiner* — Lewis West

(74) *Attorney, Agent, or Firm* — Bever, Hoffman & Harms, LLP

(57) ABSTRACT

A complementary metal oxide semiconductor transceiver analog front end circuit includes a combined transmit and receive amplifier block that produces an amplified transmit differential signal and receives a receive differential signal through the same pair of input/output nodes coupled to an external network through an RF choke block. In one embodiment the combined transmit and receive amplifier block includes separate power amplifier and low noise amplifier circuits, while a second embodiment includes a power amplification stage and a combined power amplification/low noise amplification stage. The amplifier circuits may be constructed using a combination of thin oxide core transistors and thick oxide input/output transistors. DC feeds may be selected to power the circuits in response to a transmit/receive control signal. Bias voltages to the amplifier circuits' transistors may also be set in response to the transmit/receive control signal.

22 Claims, 10 Drawing Sheets

CMOS TRANSCEIVER ANALOG FRONT END HAVING A COMBINED POWER AMPLIFIER AND LOW NOISE AMPLIFIER

BACKGROUND OF THE INVENTION

1. Field of the Invention

Embodiments of the present invention generally relate to communication transceivers, and more particularly to combining transmit and receive amplifiers in complementary metal oxide semiconductor (CMOS) transceivers.

2. Description of the Related Art

A transceiver is a well-known circuit containing a transmitter and a receiver, which are capable of transmitting and receiving communication signals, respectively. Conventionally, the transmitter's analog front end contains a power amplifier (PA) that provides the last stage of amplification of the signal to be transmitted, while the receiver's analog front end contains a low noise amplifier (LNA) that provides the initial stage of amplification of the signal to be received. In a wireless communication system, the transmit PA and receive LNA may each couple to a shared antenna through separate impedance matching networks and a common transmit/receive (T/R) switch through which both the high power transmit differential signal and the low power receive differential signal pass.

FIG. 1 illustrates a block diagram of a prior art wireless transceiver analog front end 100 coupled to a common antenna 105 through separate transmit and receive paths. The internal transmit PA 101 connects through an external differential matching network 102 and a differential to single-ended balun 103 to a T/R switch 104. In the transmit mode, the T/R switch 104 connects the transmit differential signal through node 109 to the antenna 105. Similarly the internal LNA 106 connects through a separate external differential matching network 107 and a separate differential to single-ended balun 108 to the same T/R switch 104. In the receive mode, the T/R switch 104 connects the receive differential signal to node 110 from the antenna 105. The impedance seen at the output of the transmit PA 101 toward the board is set relatively low by the external matching network 102 to maximize power transfer from the transmit PA 101 to the external balun 103. The impedance seen at the input of the LNA 106 toward the board is usually set relatively high by the external matching network 107 to maximize signal gain from the external balun 108 to the receive LNA 106. With separate transmit and receive paths, the input of the LNA 106, usually designed using lower voltage "core" transistors, is isolated by the T/R switch 104, and thereby protected, from the high voltages generated at the output of the PA 101, usually designed using higher voltage I/O transistors. While the separate external transmit and receive paths provide good signal performance and isolation, they disadvantageously add system cost and require separate transmit and receive 111, 112 I/O pins on the transceiver chip for each RF connection to an external antenna.

FIG. 2 illustrates a prior art wireless transceiver analog front end 200 that integrates the multiple impedance matching networks and T/R switch of the prior art of FIG. 1 onto a CMOS device. This integrated design reduces both the device's pin count, by decreasing the number of input/output (I/O) pins, and the wireless system's cost and board area but adds on-chip complexity. In particular, the wireless transceiver analog front end 200 includes a T/R switch 208 and a pair of transmit and receive impedance matching networks 202, 207 in the CMOS device. For the transmit path, a transmit PA 201 couples to an antenna 205 through an internal transmit impedance matching network 202, a shared external impedance matching network 203 and an external balun 204. For the receive path, a receive LNA 206 couples to the antenna 205 through an internal receive impedance matching network 207, the external impedance matching network 203 and the external balun 204. In the transmit mode, the integrated T/R switch 208 connects to node 209 (pa on) thereby shorting the LNA 206 inputs. The LNA impedance matching network 207 will appear as an open circuit to the transmit PA 201, in transmit mode, and thus will not distort the PA output transmit differential signal at nodes 211. In the receive mode, the integrated T/R switch 208 connects to node 210 (lna on) enabling the LNA receive path, while the transmit PA 201 simultaneously powers down, thus presenting a small load that does not disturb the LNA input receive differential signal at nodes 211. Advantageously in this design, integrating the T/R switch 208 and the impedance matching networks 202, 207 enables sharing a single pair of I/O pins 211 for both transmit and receive paths rather than using two separate pairs of I/O pins 111, 112 as required by the transceiver analog front end 100 of FIG. 1. The impedance of each of the matching networks 202, 203, 207 may be set individually to achieve a desired power transfer. Disadvantageously in this design the internal low impedance LNA matching network 207, which may be built from low-Q inductors, may be lossy and also sensitive to adjacent digital signals and thus prone to introduce noise spurs into the low level receive differential signal input to the LNA 206 thereby lowering receiver performance.

Therefore, what is needed is a transceiver analog front end design that integrates the transmit power amplifiers and receive low noise amplifiers, eliminates the internal impedance matching networks and uses only one pair of I/O pins in a wireless communication system thereby reducing chip cost, system cost and system board area yet maintaining the higher receiver performance of conventional designs.

SUMMARY OF THE INVENTION

An analog front end circuit within a wireless transceiver may couple both a transmit power amplifier and a receive low noise amplifier to the same pair of input/output nodes without the use of internal impedance matching networks or switches in the combined transmit and receive path. The analog front end circuit may be designed to ensure the low noise amplifier is protected from damage by the high voltages produced by the power amplifier when operating the transceiver analog front end in a transmit mode and the low noise amplifier may minimally load the transmission path of the power amplifier. Similarly the analog front end circuit may be designed to ensure the power amplifier minimally loads the receive path of the low noise amplifier when operating the transceiver analog front end in the receive mode.

In one embodiment, the analog front end circuit includes separate power amplifier and low noise amplifier circuits commonly coupled through an RF choke block to the same pair of input/output nodes, wherein the amplifier circuits are designed with a combination of thin oxide core transistors and thick oxide input/output transistors. A combination of fixed, selectable or switched power supplies may be coupled to the amplifier circuits to ensure proper operation by enabling or disabling sections of the analog front end circuit in response to a transmit/receive control signal. The choice of transistor type, transistor bias voltages and power supply voltages in the analog front end circuit may vary based on the operating range of the amplifier circuits and the underlying CMOS technology. Both the power amplifier and the low noise amplifier may couple through an RF choke block to the same external impedance matching network.

In another embodiment, the analog front end circuit includes a power amplification stage and a shared power amplification/low noise amplification stage, the latter through which both the transmit and receive differential signals pass. A combination of selectable and switched power supplies may be coupled to the amplifier circuits, in response to a transmit/receive control signal, thereby enabling the shared amplification stage to act as a transmit power amplifier in the transmit mode and as a low noise receive amplifier in the receive mode.

DETAILED DESCRIPTION

Figure 3A:
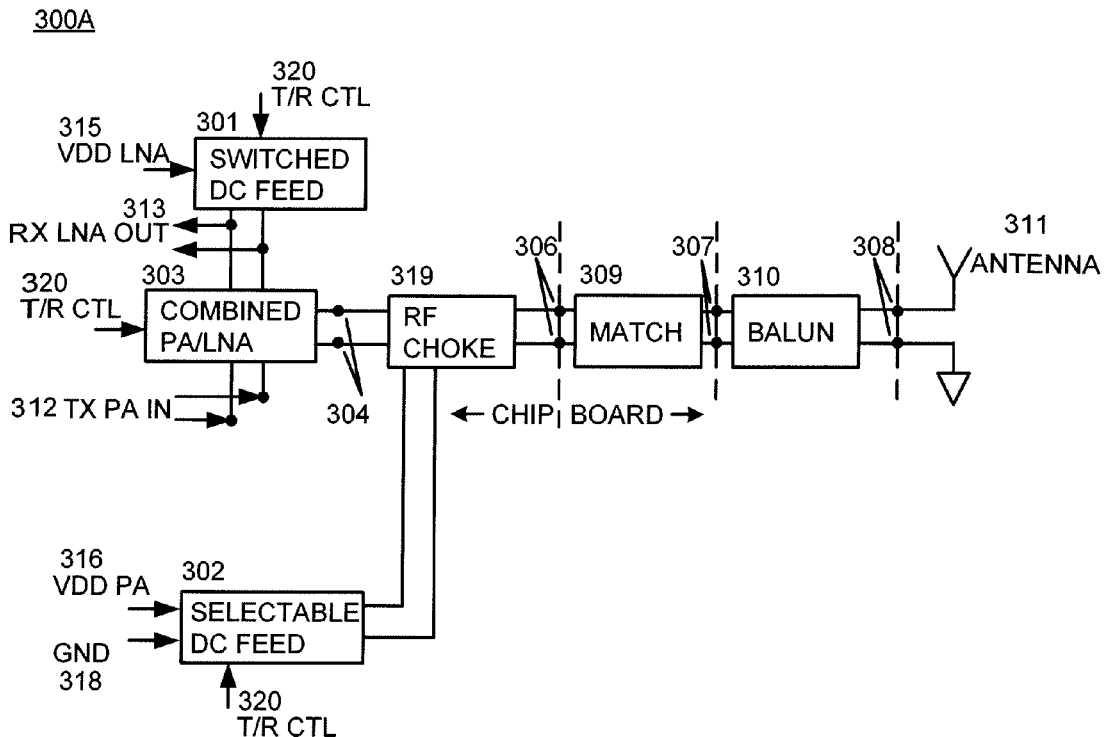
FIG. 3A illustrates a high level block diagram of a combined transmit and receive amplifier block within a wireless transceiver analog front end with a common external transmit/receive path and with a switched power feed and a selectable power feed.
Figure 3B:
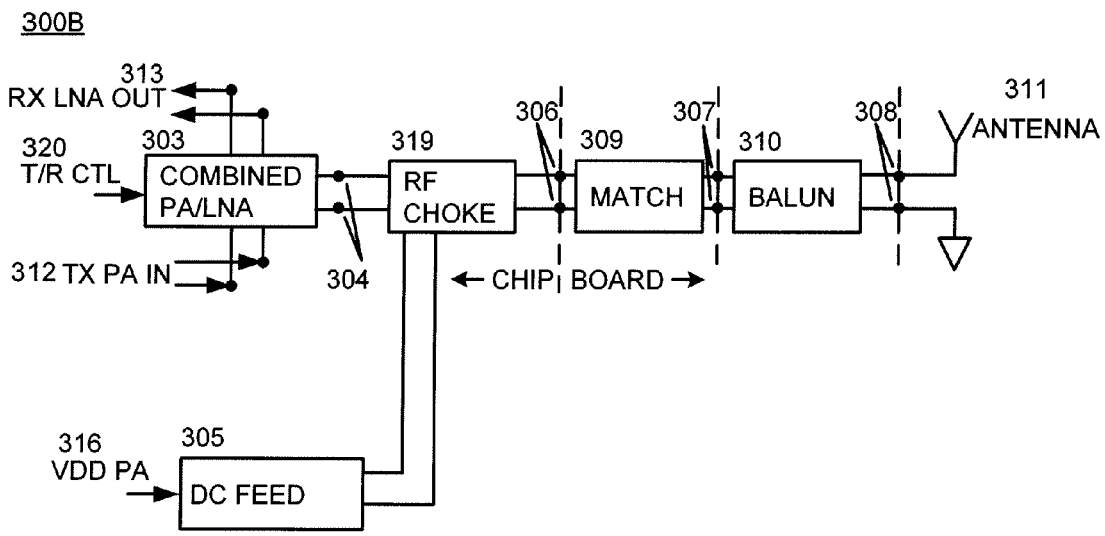
FIG. 3B illustrates a high level block diagram of a combined transmit and receive amplifier block within a wireless transceiver analog front end with a common external transmit/receive path and with a fixed power feed.

FIGS. 3A and 3B illustrate exemplary block diagrams of analog front end circuits 300A and 300B, respectively that can be used in a wireless transceiver analog front end. Notably, each analog front end circuit includes a combined transmit and receive amplifier block 303 coupled to a common external (board level) transmit/receive (T/R) path through an RF choke block 319 and a single common set of input/output (I/O) pins 306, used for both transmission and reception of an RF signal, which connects to an antenna 311 through an external impedance matching network 309 and a balun 310.

When the combined transmit and receive amplifier block 303 operates in a transmit mode in response to a T/R control signal T/R CTL 320, a transmit power amplifier (PA) input signal TX PA IN 312 is amplified using a power VDD PA 316 supplied through the RF choke block 319. In one embodiment shown in FIG. 3A the power VDD PA 316 may be supplied through a selectable DC feed 302 in response to the T/R control signal T/R CTL 320; while in a different embodiment shown in FIG. 3B the power VDD PA 316 supply may be fixed, i.e. no selectable switch required. The combined transmit and receive amplifier block 303 is designed to ensure the low noise amplifier (LNA) contained therein is protected from damage by the high voltages generated by the transmitting power amplifier (PA) connected thereto. In the embodiment shown in FIG. 3A a switched DC feed 301 (also in response to the T/R control signal T/R CTL 320) disconnects a power VDD LNA 315 from the combined transmit and receive amplifier block 303 to minimize loading of the PA contained therein by the LNA connected to the PA. In the embodiment shown in FIG. 3B, the switched DC feed 301 of FIG. 3A may be omitted.

When the combined transmit and receive amplifier block 303 of FIG. 3A operates in a receive mode, the switched DC feed 301 in response to the T/R control signal T/R CTL 320 supplies the power VDD LNA 315 to generate a low noise amplifier (LNA) receive output signal RX LNA OUT 313. Simultaneously the selectable DC feed 302 connects a ground GND 318 through the RF choke block 319 to nodes 304 to ensure the PA contained in the combined transmit and receive amplifier block 303 minimally loads the LNA. In the embodiment shown in FIG. 3B, a fixed power VDD PA 316 supplies the LNA generating the output signal RX LNA OUT 313. Further details of two different specific architectures 303A and 303B for the combined transit and receive amplifier 303 are described below.

Figure 4A:
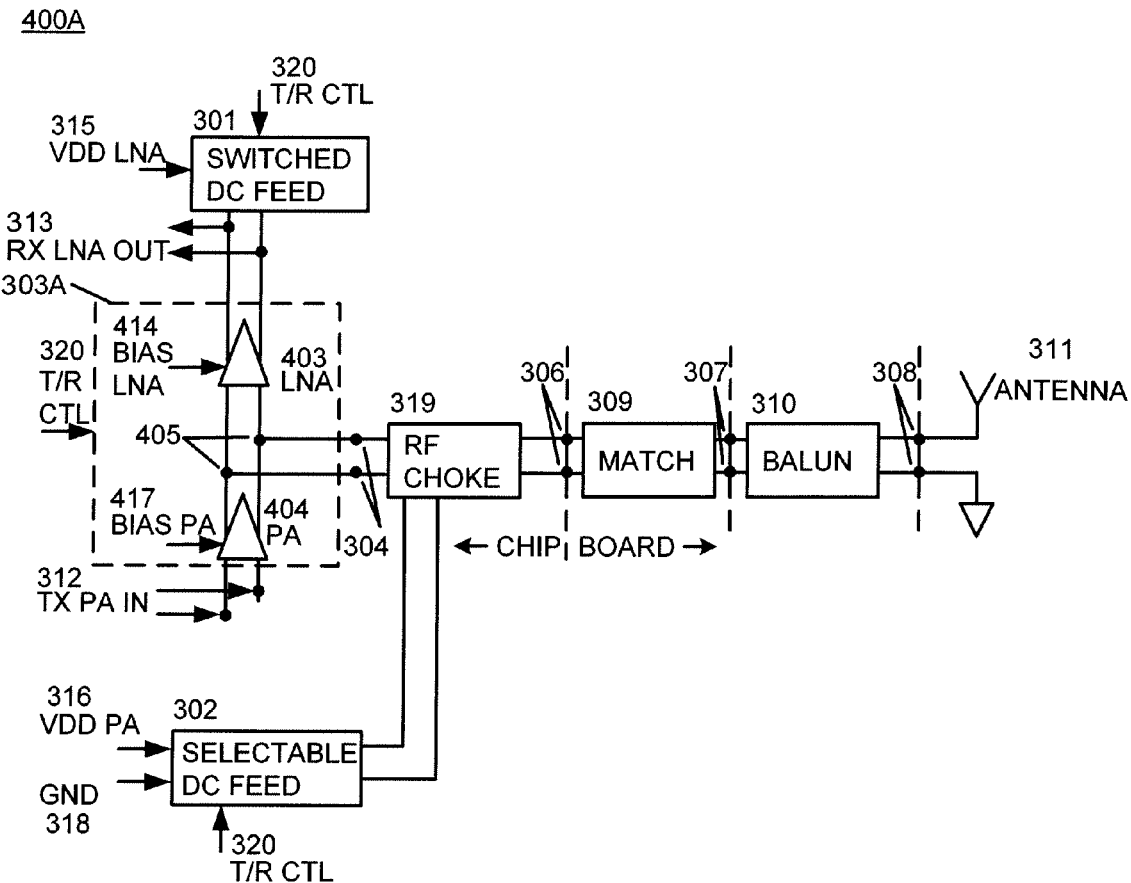
FIGS. 4A and 4B illustrate high level diagrams of the combined transmit and receive amplifier block within FIGS. 3A and 3B respectively.

FIG. 4A illustrates a more detailed block diagram 400A of the wireless transceiver analog front end 300A of FIG. 3A with the combined transmit and receive amplifier block 303A constructed from a PA 404 and an LNA 403 connected in parallel and sharing a common external transmit/receive (T/R) path. Both the output of the PA 404 and the input to the LNA 403 connect directly to a common set of nodes 405 in a CMOS integrated circuit.

When the combined transmit and receive amplifier block 303A operates in a transmit mode, the selectable DC feed 302, in response to the T/R control signal T/R CTL 320, supplies the power VDD PA 316 through the RF choke block 319 to the PA 404 while the switched DC feed 301, in response to the T/R control signal T/R CTL 320, disconnects the power VDD LNA 315 from the LNA 403, thereby enabling transmission of the transmit differential signal TX PA IN 312 to the shared I/O nodes 306. A bias voltage BIAS LNA 414, in response to the T/R control signal T/R CTL 320, may be set at the LNA 403 to protect the LNA 403 from damage by high voltages that may be produced by the PA 404 at the common set of nodes 405. The description of FIG. 5A below provides additional detail on the bias voltage BIAS LNA 414.

When the combined transmit and receive amplifier block 303A operates in a receive mode, the switched DC feed 301, in response to the T/R control signal T/R CTL 320, supplies the power VDD LNA 315 to the LNA 403 while the selectable DC feed 302, in response to the T/R control signal T/R CTL 320, decouples the power VDD PA 316 from and couples the ground GND 318 through the RF choke block 319 to the PA 404, thereby providing reception of the receive differential signal RX LNA OUT 313 from the shared I/O nodes 306. A bias voltage BIAS PA 417, in response to the T/R control signal T/R CTL 320, may be set at the PA 404 to minimize the load of the PA 404 on the LNA 403 at the common set of nodes 405. The description of FIG. 5A below provides additional detail on the bias voltage BIAS PA 417.

Figure 4B:
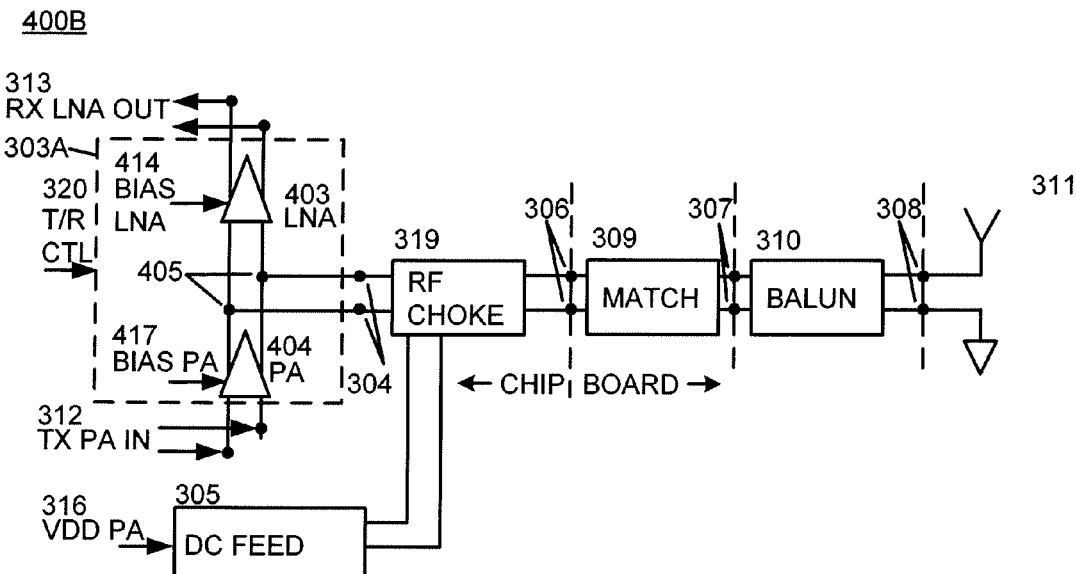

FIG. 4B illustrates a detailed block diagram 400B of the wireless transceiver analog front end 300B of FIG. 3B. FIG. 4B provides an embodiment of the combined transmit and receive amplifier block 303A in which the selectable DC feed 302 is replaced by a fixed DC feed 305 and the switched DC feed 301 is omitted. The supply voltage VDD PA 316 may be used to power both the PA 404, when operating the combined receive amplifier 303A in transmit mode, and the LNA 404, when operating in the receive mode. The bias voltages BIAS LNA 414 and BIAS PA 417 may be set, in response to the T/R control signal T/R CTL 320, in transmit or receive modes to ensure proper operation of the PA 404 and the LNA 403 as in FIG. 4A. In particular, in transmit mode, BIAS PA 417 will enable the PA while BIAS LNA 414 will disable the LNA, and conversely, in receive mode, BIAS PA 417 will disable the PA and BIAS LNA 414 will enable the LNA.

Figure 5A:
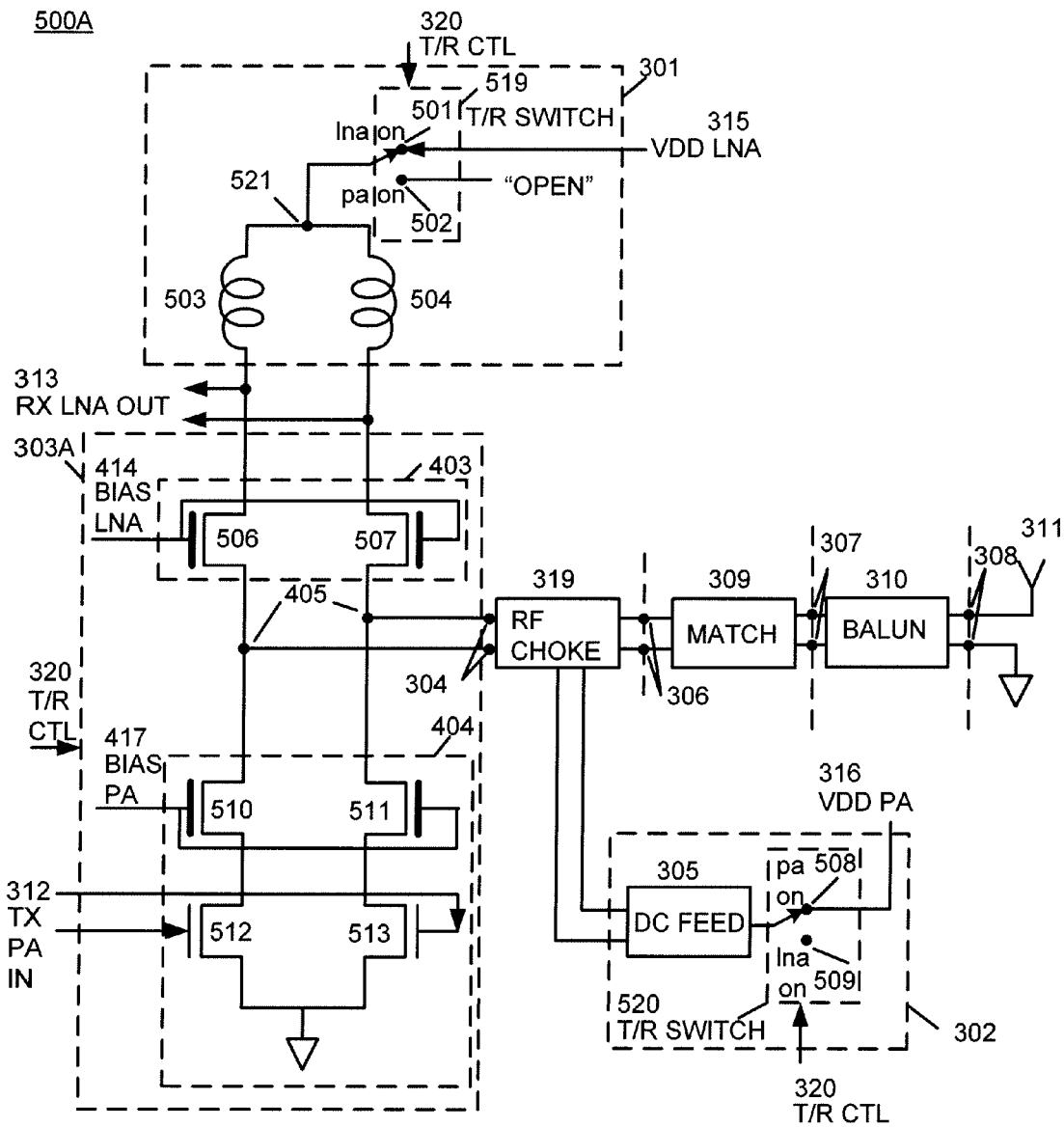
FIGS. 5A and 5B illustrate specific embodiments of the amplifiers contained in the combined transmit and receive amplifier block of FIGS. 4A and 4B respectively.

FIG. 5A illustrates a detailed block diagram of certain components of a wireless transceiver analog front end 500A using one embodiment of the combined transmit and receive amplifier block 303A of FIG. 4A. In this embodiment, the PA 404 and the LNA 403 connect directly in parallel to the common set of internal nodes 405 and then couple through the RF choke block 319 to the shared set of I/O nodes 306. The PA 404 may be constructed from two pairs of transistors, while the LNA 403 may be constructed from one pair of transistors. The transmit differential signal TX PA IN 312 may be amplified through a pair of lower voltage core transistors 512, 513 and then through a pair of higher voltage I/O transistors 510, 511. The amplified transmit differential signal thereby generated at the common I/O nodes 405 couples to the shared I/O nodes 306 through the RF choke block 319 and then to the external impedance matching network 309, the balun 310 and the antenna 311.

The narrow width gate shown on the core transistors 512, 513 indicates "thin oxide", while the thicker width gate shown on the I/O transistors 510, 511 indicate "thick oxide." Core transistors may operate at relatively lower supply voltages, to minimize power consumption and improve sensitivity, than I/O transistors that may transmit and receive differential signals to and from off-chip. The actual thicknesses and voltages for the core transistors and input/output transistors may depend on the particular semiconductor process used to manufacture the device. In one such 0.13μ process, the core transistors may have 2.8 nm thickness operating at 1.2V, while the input/output transistors may have 7 nm thickness operating at 3.3V.

When operating the combined transmit and receive amplifier block 303A in the transmit mode, a T/R switch 520, in response to the T/R control signal T/R CTL 320, is set to a node 508 (pa on) providing the power VDD PA 316 to the transmit path's PA 404, while simultaneously the T/R switch 519, in response to the T/R CTL signal 320, is set to a node 502 (pa on) thereby decoupling the power VDD LNA 315 from the LNA 403.

When operating the combined transmit and receive amplifier block 303A in transmit mode, voltages at the common nodes 405, which are both outputs from the PA 404 and inputs to the LNA 403, can peak at twice the supply voltage VDD PA 316. Prior art designs for low noise amplifiers used "thin oxide" transistors, which may be more sensitive to higher voltages, in place of the "thick oxide" 506, 507 transistors used in the LNA 403. A bias voltage BIAS LNA 414 into the LNA transistors 506, 507 may be set to protect the LNA transistors 506, 507 from the high transmit differential signal voltages generated by the PA 404 but also may be set to minimize activation of the LNA transistors 506, 507. In one embodiment the voltage VDD PA 316 may be approximately 1.8V, and thus the peak voltages at the common nodes 405 connected to the input of the LNA 403 may reach approximately 3.6V. In this example, the bias voltage BIAS LNA 414 may be set to zero volts (ground) as the "thick oxide" transistors 506, 507 of the LNA 403 can sustain such voltages without degradation. In another embodiment the voltage VDD PA 316 may be approximately 3.3 V resulting in peak voltages of approximately 6.6V at the common nodes 405. In this relatively higher voltage example, the bias voltage BIAS LNA 414 may be set to a voltage greater than zero, but less than the LNA transistors' 506, 507 threshold voltage, thus reducing the voltage across the LNA transistors 506, 507 thereby protecting them from damage by the higher voltage generated by the PA 404 at common nodes 405. In one embodiment, the bias voltage BIAS LNA 414 may be set to a range between 2 through 2.5 volts to protect LNA transistors 506, 507.

When operating the combined transmit and receive amplifier block 303A in transmit mode, a mid-point 521 of a pair of inductors 503, 504 in the switched DC feed 301 connects to an "open node" 502 (pa on) in the T/R switch 519, in response to the T/R CTL signal 320, and thus floats. In this mode the pair of inductors 503, 504 in the switched DC feed 301 provide a high impedance, thus, minimally loading the PA 404 by the LNA 403 and ensuring the transmit output power conducted to the I/O nodes 306 is not appreciably reduced by the parallel connection of the LNA 403 at the common nodes 405. Typically, when operating the transmit and receive amplifier block 303A in transmit mode, the impedance of the LNA 403 seen by the PA 404 at common nodes 405 exceeds 15× the impedance of the external matching network 309 seen by the PA 404 thereby transferring power from the transmit PA 404 to the external antenna 311.

When operating the combined transmit and receive amplifier block 303A in receive mode, the T/R switch 520 in the selectable DC feed 302, in response to T/R control signal T/R CTL 320, couples a DC feed 305 to a node 509 (lna on) grounding the voltage to the output of the PA I/O transistors 510, 511 through the RF choke block 319, and thus the PA 404 appears as an open circuit to the LNA 403 at the common nodes 605. The bias voltage BIAS LNA 414 at LNA transistors 506, 507 may be set to an appropriate non-zero value to amplify the receive differential signal at the common nodes 605 generating an amplified received signal RX LNA OUT 313. The LNA transistors 506, 507 are impedance matched to the external matched network 309 thus efficiently transferring receive power from the shared I/O nodes 306 to the LNA 403.

Figure 5B:
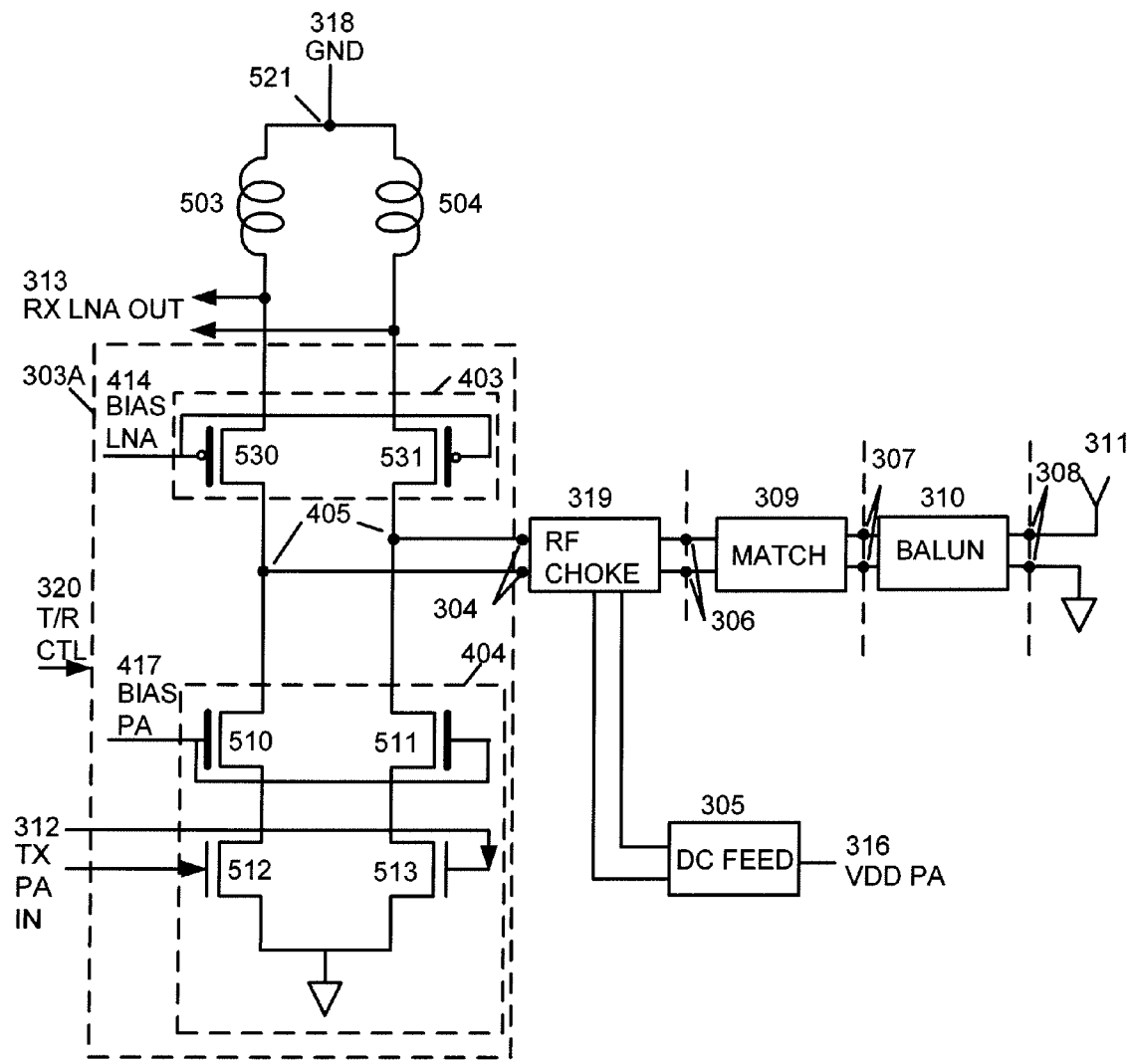

FIG. 5B illustrates a detailed block diagram of certain components of a wireless transceiver analog front end 500B using one embodiment of the combined transmit and receive amplifier block 303A of FIG. 4B. The PA 404 is identical to the embodiment shown in FIG. 5A, and the BIAS PA 417 is set similarly to enable or disable the PA 404 as required during transmit or receive operation respectively. In contrast, the LNA 403 may be constructed using a pair of PMOS transistors 530 and 531 (rather than the pair of NMOS transistors 506 and 507 of FIG. 5A). In this embodiment the BIAS LNA 414 may be set to VDD PA 316 during transmit mode to disable the LNA 403 and to a voltage less than VDD PA 316 during receive mode to enable the LNA 403. As in FIG. 5A the LNA 403 is constructed using "thick oxide" transistors to enable withstanding the higher voltages generated by the PA 404 during transmit mode. Thus with a judicious choice of transistor technology and bias voltages for the LNA 403 and PA 404, the combined transmit and receive amplifier block 303A can operate properly.

Figure 1:
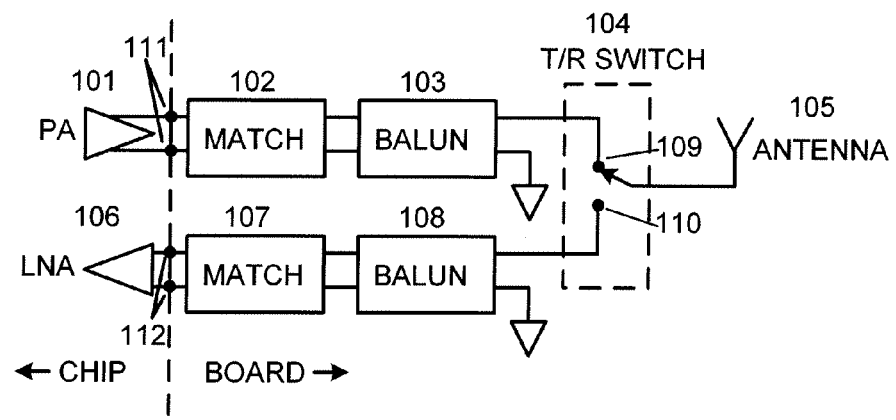
FIG. 1 illustrates a block diagram of a prior art wireless transceiver analog front end with separate external transmit and receive paths.
Figure 2:
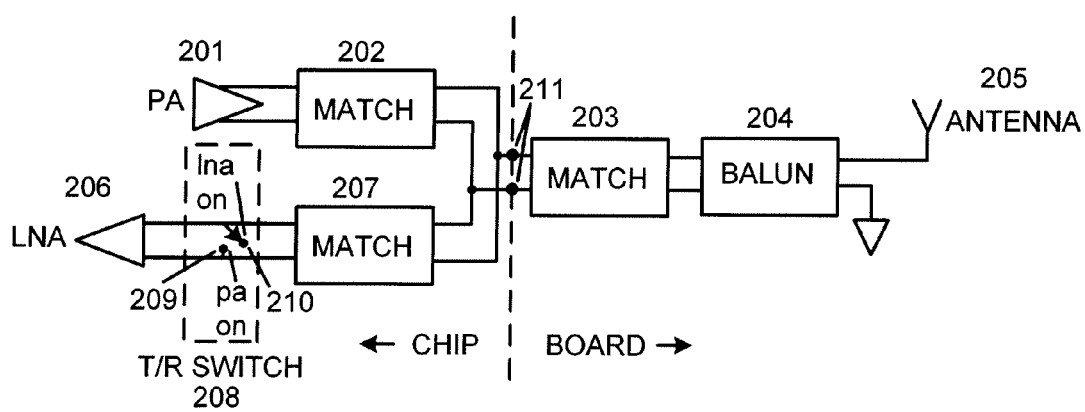
FIG. 2 illustrates a block diagram of a prior art wireless transceiver analog front end with a common external transmit/receive path.

Unlike the prior art illustrated in FIG. 2, the embodiments in FIGS. 5A and 5B do not require the separate internal impedance matching networks 202, 207 nor the integrated T/R switch 208 that can support the high output current of the PA thereby reducing chip area and cost. The output impedance of the PA 404 and the input impedance of the LNA 403 are both matched to the single external impedance matching network 309. The PA 404 and LNA 403, connected in parallel to the common nodes 605, along with supporting circuitry and control signals, are designed to not disturb one another when operating as a combined transmit and receive amplifier block 303A in transmit or receive modes thereby maintaining good performance of the PA 404 and the LNA 403.

Figure 6:
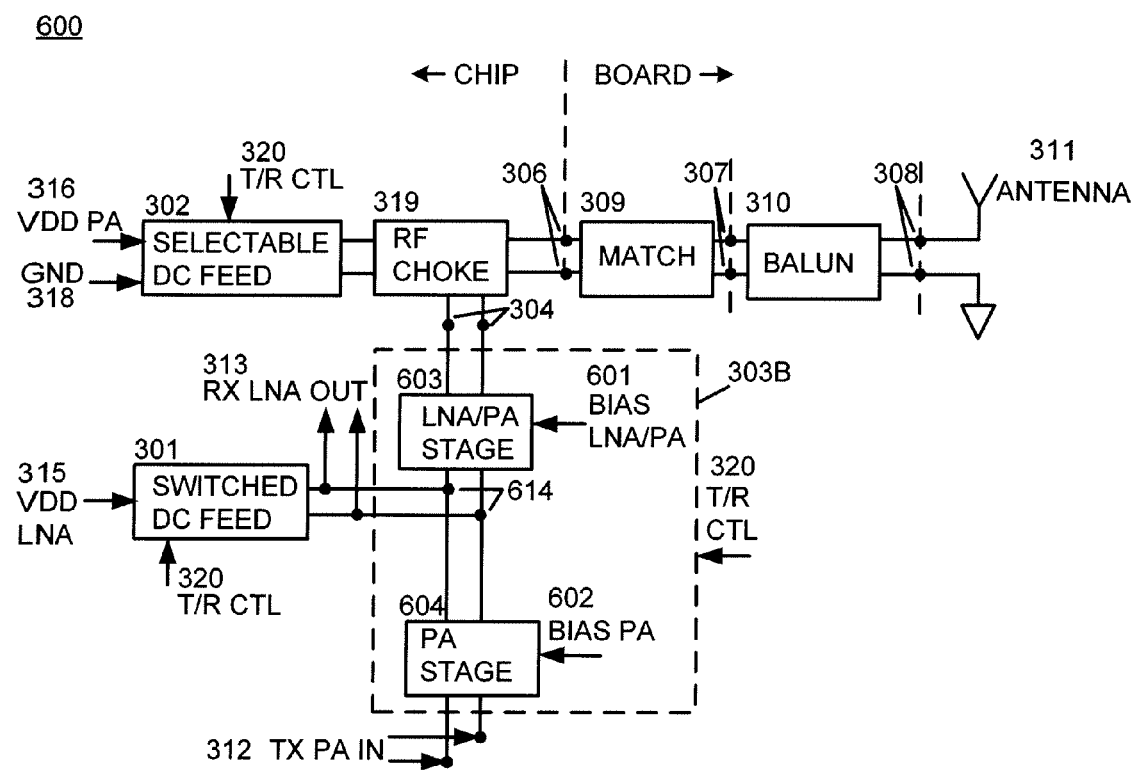
FIG. 6 illustrates a high level block diagram of an alternative architecture for the combined transmit and receive amplifier block within FIG. 3A.

FIG. 6 illustrates a block diagram of a wireless transceiver analog front end 600 with a combined transmit and receive amplifier block 303B constructed from two amplifier stages 603 and 604 that share a common transmit/receive path. In this embodiment, both the transmit PA and the receive LNA share a common amplifier stage 603 coupled to the I/O nodes 306 through the RF choke block 319.

When the combined transmit and receive amplifier block 303B operates in the transmit mode, the selectable DC feed 302, in response to the T/R control signal T/R CTL 320, couples the power VDD PA 316 through the RF choke block 319 to the shared LNA/PA stage 603. Simultaneously the switched DC feed 301, in response to the T/R control signal T/R CTL 320, disconnects the power VDD LNA 315 from the shared LNA/PA stage 603, thereby enabling amplified transmission of the transmit differential signal TX PA IN 312 to the shared I/O nodes 306. An initial PA stage 604 may provide a first amplification while the shared LNA/PA stage 603 may provide a further second amplification of the transmit differential signal TX PA IN 312. A bias voltage BIAS LNA/PA 601 to the shared LNA/PA stage 603 may be set at a level to protect the initial PA stage 604 from damage by the high voltages produced at the common I/O nodes 306 when operating in the transmit mode.

When the combined transmit and receive amplifier block 303B operates in the receive mode, the switched DC feed 301, in response to the T/R CTL 320 signal, couples the power VDD LNA 315 to the shared LNA/PA stage 603, while the selectable DC feed 302, in response to the T/R control signal T/R CTL 320, decouples the power VDD PA 316 and couples the ground GND 318 to the LNA/PA stage 603 through the RF choke block 319, thereby enabling reception of the receive differential signal RX LNA OUT 313 from the common I/O nodes 306 through the LNA/PA stage 603. If present in this embodiment, a bias voltage BIAS PA 602 to the initial PA stage 604 may be set to zero volts (grounded) to minimize the load of the initial PA stage 604 on the LNA/PA stage 603 at nodes 614 when operating in the receive mode.

Figure 7:
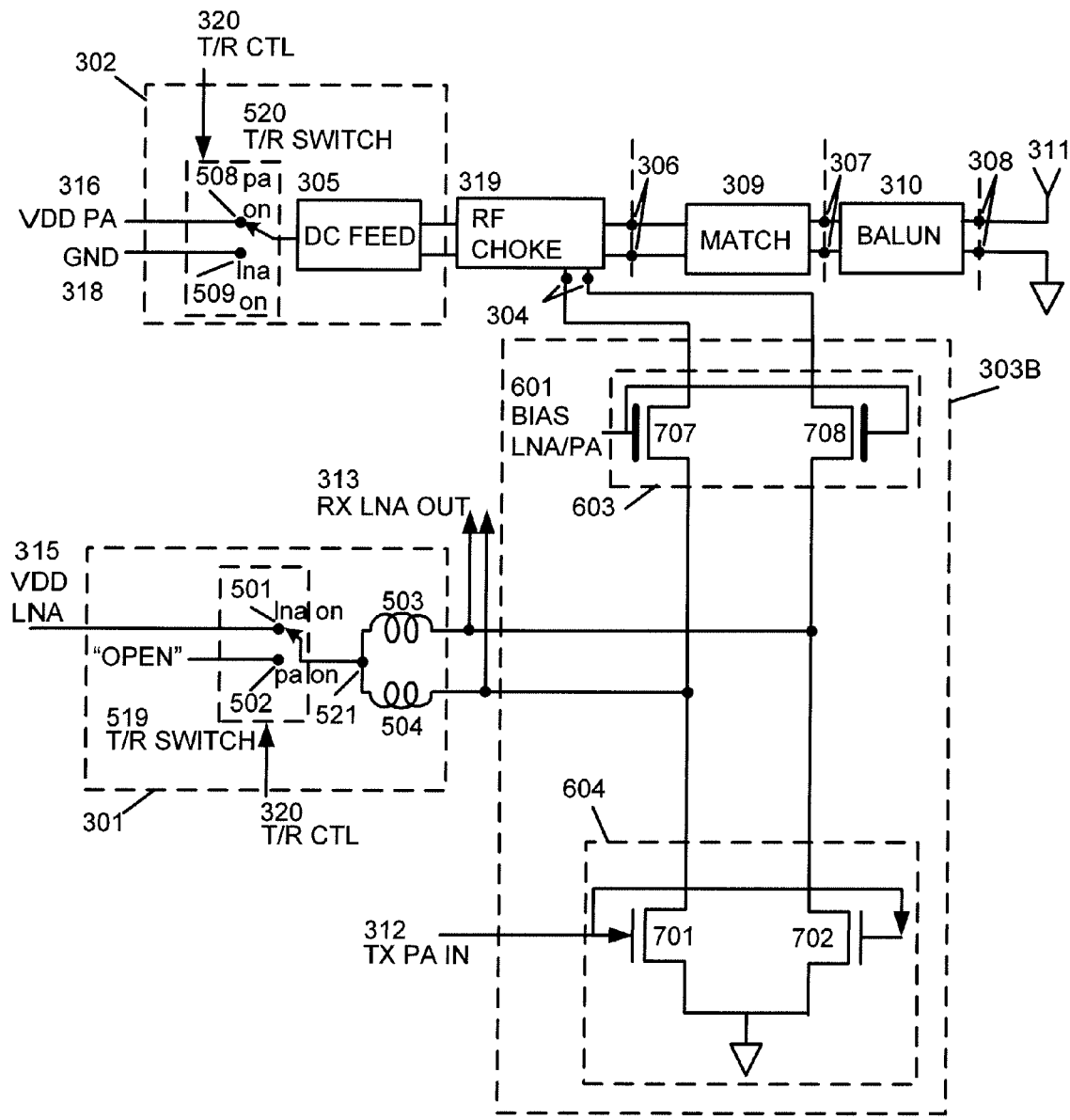
FIG. 7 illustrates a detailed block diagram of one embodiment of the combined transmit and receive amplifier block of FIG. 6.

FIG. 7 illustrates a detailed block diagram of a wireless transceiver analog front end 700 using one embodiment of the combined transmit and receive amplifier block 303B of FIG. 6. In this embodiment a pair of transistors 701, 702 form the initial PA stage 604 that provides the first level of amplification for the transmit differential signal TX PA IN 312. A second pair of transistors 707, 708 form the common LNA/PA stage 603 shared by the transmit and receive paths. When the combined transmit and receive amplifier block 303B operates in the transmit mode, the T/R switch 520 in the selectable DC feed 302, in response to the T/R control signal T/R CTL 320, is set to the node 508 (pa on) supplying the power VDD PA 316 to the LNA/PA stage 603 and to the PA stage 604. Simultaneously the T/R switch 519 in the switched DC feed 301, in response to the T/R control signal T/R CTL 320, is set to the "open" node 502 (pa on) decoupling the power VDD LNA 315 from the mid-point 521 of the pair of inductors 503, 504. The transmit path in FIG. 7 from the TX PA IN signal 312 to the common I/O nodes 306 through the two stages of amplification 604 and 603 operates with no interference from the pair of inductors 503, 504.

In one embodiment the pair of transistors 701, 702 in the PA stage 604 are constructed from "thin oxide" core transistors, while the pair of transistors 707, 708 in the shared LNA/PA stage 603 are constructed from "thick oxide" I/O transistors. The pair of "thick oxide" I/O transistors 707, 708 in the common LNA/PA stage 603 may be impedance matched to the external impedance matching network 309 to transfer power during transmission. The bias voltage LNA/PA BIAS 601 into the "thick oxide" I/O transistors 707, 708 in the shared LNA/PA stage 603 may be set at a level to protect the "thin oxide" core transistors 701, 702 in the PA stage 604 from damage of high voltages generated at common I/O nodes 306 when operating the combined transmit and receive amplifier block 303B in the transmit mode.

When the combined transmit and receive amplifier block 303B operates in the receive mode, the T/R switch 520 in the selectable DC feed 302, in response to the T/R control signal T/R CTL 320, is set to the node 509 (lna on) coupling the ground GND 318 to the DC feed 305, while the T/R switch 519 in the switched DC feed 301, in response to the T/R control signal T/R CTL 320, is set to the node 501 (lna on) coupling the power VDD LNA 315 for the receive path through the pair of inductors 503, 504. The gates of transistors 701, 702 in the PA stage 604 may be set to zero volts when operating the combined transmit and receive amplifier block 303B in the receive mode, to ensure the receive differential signal transfers from the common I/O nodes 306 to RX LNA OUT 313. The embodiment in FIG. 7 requires two fewer I/O transistors than the embodiment in FIG. 3, thus reducing total chip area; however, the pair of transistors 701, 702 in the PA stage 604 in FIG. 7 may add extra capacitive loading of the receive differential signal RX LNA OUT 313 thereby changing the receive LNA performance compared with the embodiment of FIG. 3.

Figure 8:
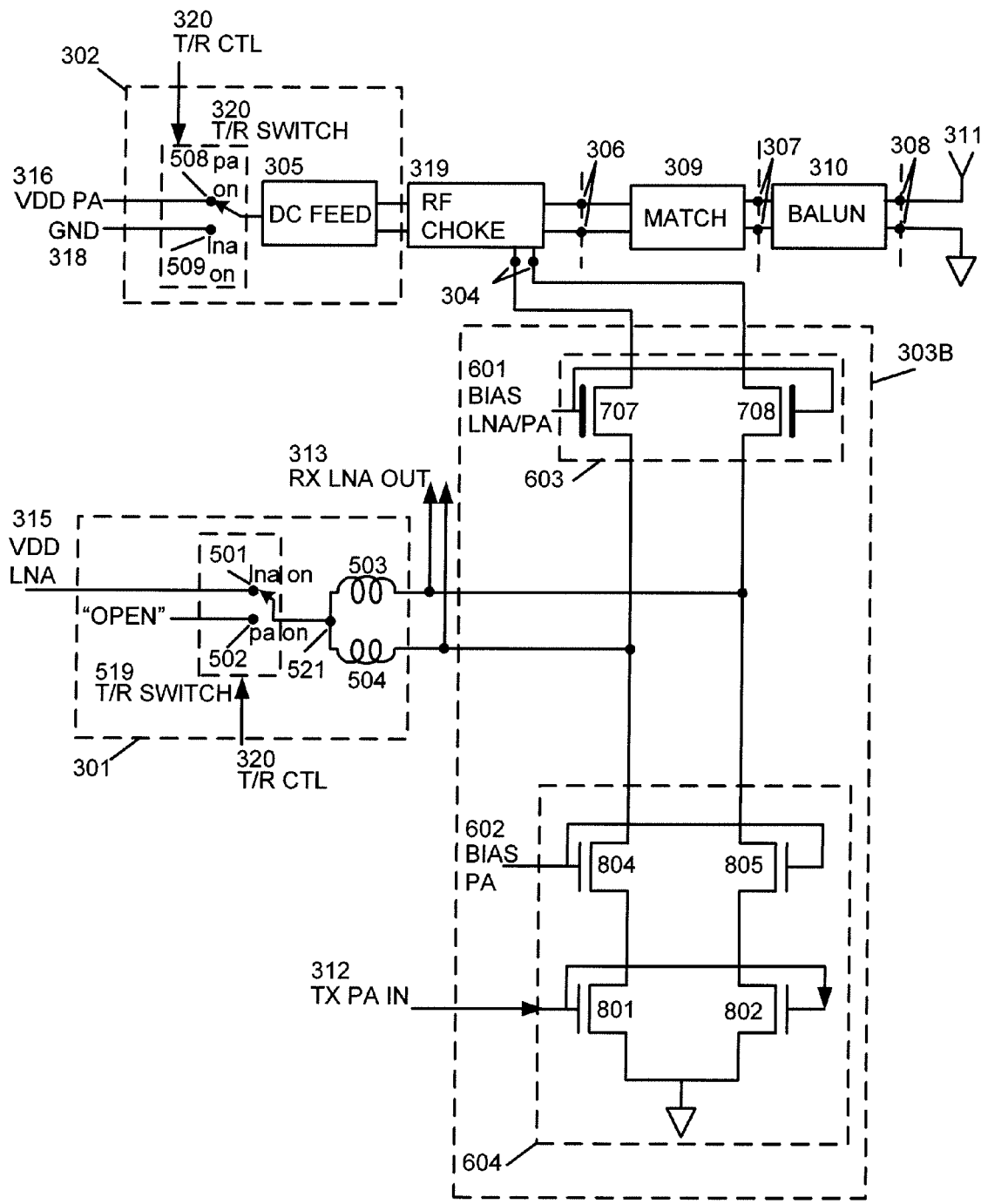
FIG. 8 illustrates a detailed block diagram of a second embodiment of the combined transmit and receive amplifier block of FIG. 6.

FIG. 8 illustrates a detailed block diagram of a wireless transceiver analog front end 800 using another embodiment of the combined transmit and receive amplifier block 303B of FIG. 6 constructed with two pairs of transistors 801, 802 and 804, 805 connected in series in the PA stage 604. The selectable DC feed block 302 and the switched DC feed block 301 in FIG. 8 operate the same as in FIG. 7, coupling the VDD PA 316 power in transmit mode and the VDD LNA 315 power in receive mode.

When operating the combined transmit and receive amplifier block 303B in the receive mode, the bias voltage BIAS PA 602 into transistors 804, 805 in the PA stage 604 may be set to zero volts. The transistors 804, 805 used in the initial PA stage 604 of FIG. 8 may be smaller in size than the transistors 701, 702 used in the initial PA stage 604 of FIG. 7, because their transconductance may be smaller, thus providing less excess capacitive loading of the RX LNA OUT signal 313. Thus when operating the embodiment of the combined transmit and receive amplifier block 303B in the receive mode, the RX LNA OUT 313 signal in FIG. 8 will achieve greater gain than the same signal RX LNA OUT 313 in FIG. 7.

When operating the combined transmit and receive amplifier block 303B of FIG. 8 in the transmit mode, all three pairs of transistors 801, 802 and 804, 805 and 707, 708 are in the signal path of the transmit differential signal TX PA IN 312. The bias voltage BIAS LNA/PA 601 into transistors 707, 708 in FIG. 8 may be set to a higher level than the same bias voltage LNA/PA 601 in FIG. 7, because the intermediate pair of transistors 804, 805 in FIG. 8 provide an additional gain stage between the transmit differential signal TX PA IN 312 and the common I/O nodes 306.

Example bias voltage levels and transmit PA input signal levels appropriate for the embodiments shown in FIGS. 3-7 are summarized in the following table for I/O voltages of 1.8V and 3.3V. For each of the signals, either the voltage level is set to zero, positive, variable or don't care. Typical ranges are shown for positive values.

|  | SIGNAL NAME | VDD PA = 1.8 V (TX) | VDD PA = 1.8 V (RX) | VDD PA = 3.3 V (TX) | VDD PA = 3.3 V (RX) |
|---|---|---|---|---|---|
| FIGS. 4A and 5A | BIAS LNA | 0 | >0 (0.5-0.6 V) | >0 (2-2.5 V) | >0 (0.5-0.6 V) |
|  | BIAS PA | >0 (1.8 V) | 0 | >0 (2 V) | 0 |
|  | TX PA IN | Variable | Don't Care | Variable | Don't Care |
| FIGS. 4B and 5B | BIAS LNA | VDD PA (1.8 V) | VDD PA − 0.5 (1.3 V) | VDD PA (3.3 V) | VDD PA − 0.5 (2.8 V) |
|  | BIAS PA | >0 (1.8 V) | 0 | >0 (2 V) | 0 |
|  | TX PA IN | Variable | Don't Care | Variable | Don't Care |
| FIGS. 6 and 7 | BIAS LNA/PA | >0 (1.8 V) | >0 (0.5-0.6 V) | >0 (2-2.5 V) | >0 (0.5-0.6 V) |
|  | TX PA IN | Variable | 0 | Variable | 0 |
| FIGS. 6 and 8 | BIAS LNA/PA | N/A | N/A | >0 (3.3 V) | >0 (0.5-0.6 V) |
|  | BIAS PA | N/A | N/A | >0 (1.8 V) | 0 |
|  | TX PA IN | N/A | N/A | Variable | Don't Care |

Figure 9:
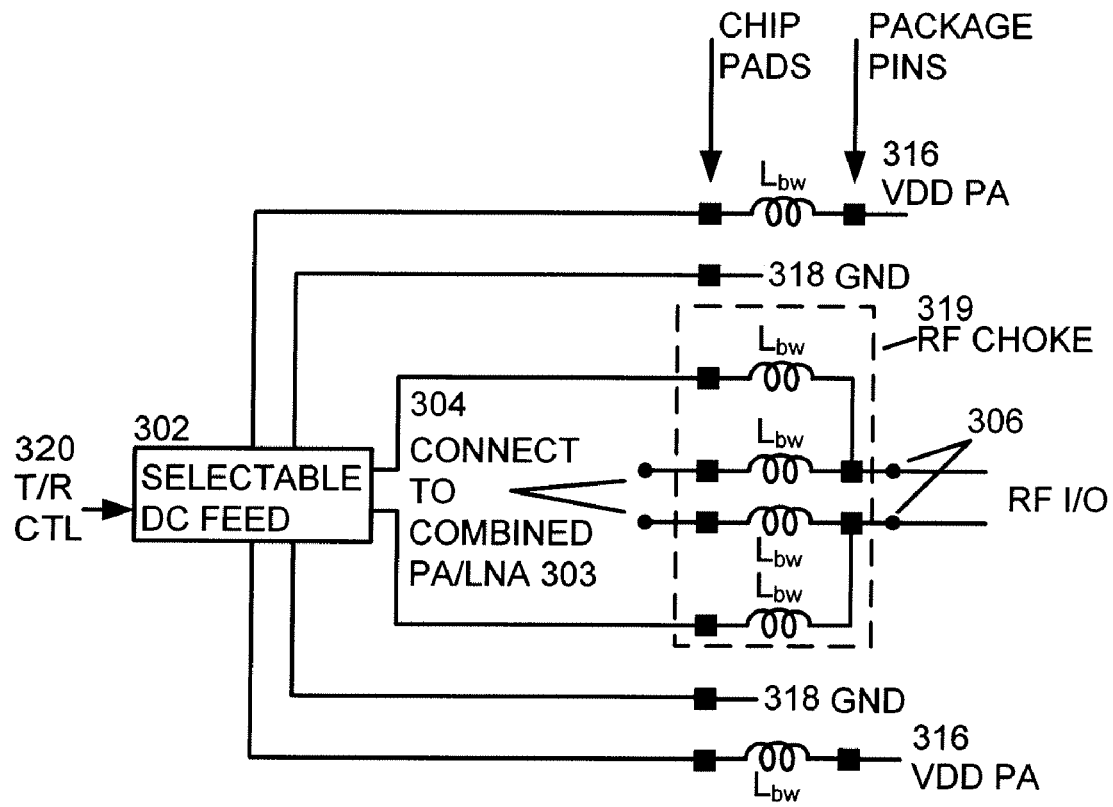
FIG. 9 illustrates a four inductor RF choke block constructed using integrated circuit bond wires.
Figure 10:
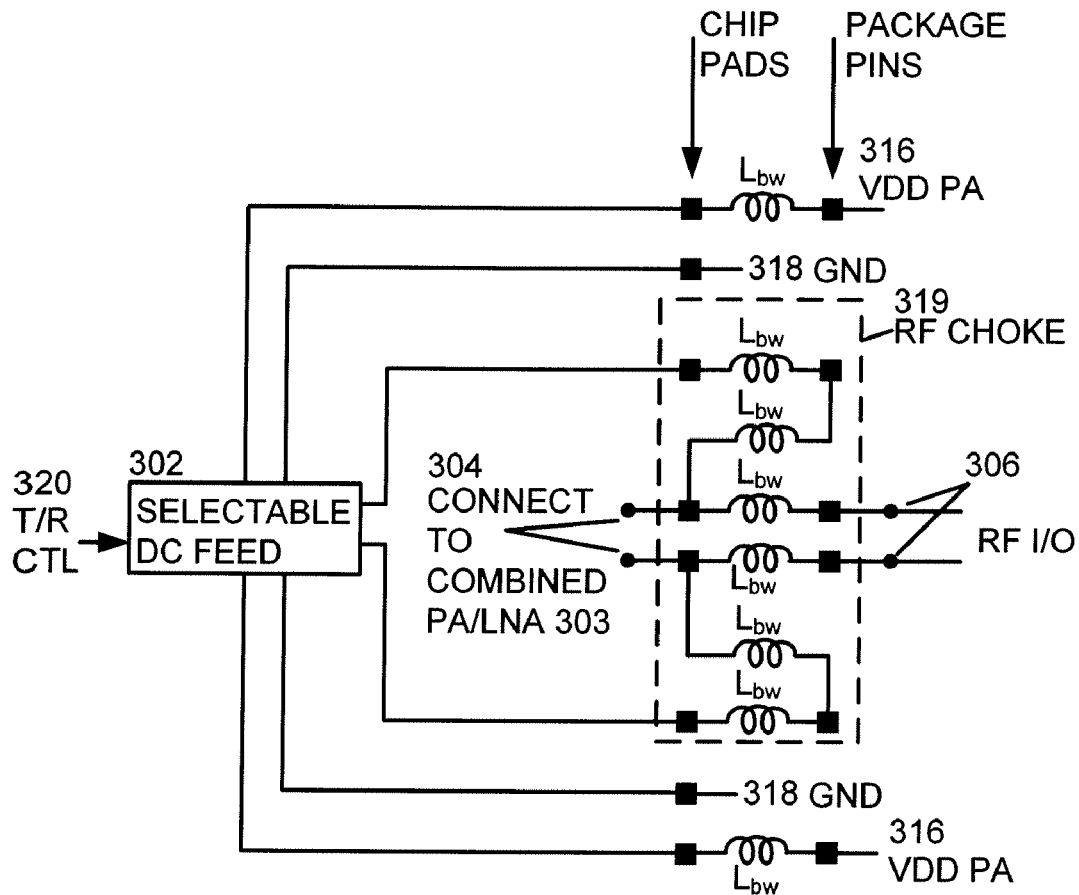
FIG. 10 illustrates a six inductor RF choke block constructed using integrated circuit bond wires.

FIGS. 9 and 10 illustrate two embodiments of the RF choke block 319 used in FIGS. 3-8. The RF choke block 319 connects the selectable DC feed 302 to the common I/O nodes 306 providing power to the combined transmit and receive amplifier block 303B when operating in the transmit mode. Each bond wire between a pad on the integrated circuit and a pin on the package may act as a small inductor $L_{bw}$.

While FIGS. 3-8 indicate a chip/board boundary at nodes 306, the external impedance matching network 309 and balun 310 may also be integrated onto the integrated circuit thereby shifting the chip/board boundary to nodes 307 or 308 and further reducing the total system cost and board area. The benefits of such integration may be considered along with the performance differences of internal "on-chip" designs versus external "off-chip" components for the impedance matching network 309 and balun 310.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A complementary metal oxide semiconductor (CMOS) transceiver analog front end circuit comprising:
   a combined transmit and receive amplifier block including:
      a transmit amplifier stage that receives a transmit differential signal at a first pair of nodes and produces a first stage amplified transmit differential signal at a third pair of nodes;
      a shared transmit/receive amplifier stage that couples between the third pair of nodes and a second pair of nodes;
      wherein, in transmit mode, the shared transmit/receive amplifier stage receives the first stage amplified transmit differential signal at the third pair of nodes and produces an amplified transmit differential signal at the second pair of nodes; and,
      wherein, in receive mode, the shared transmit/receive amplifier stage receives a receive differential signal at the second pair of nodes and produces an amplified receive differential signal at the third pair of nodes; and
      a first bias voltage coupled to the shared transmit/receive amplifier stage;
   an RF choke block coupled between the second pair of nodes and a pair of input/output nodes through which the amplified transmit differential signal and the receive differential signal couple to an antenna;
   a selectable power feed, responsive to a transmit/receive control signal, coupled to the RF choke block;
   a switched power feed, responsive to the transmit/receive control signal, coupled to the third pair of nodes.

2. The apparatus of claim 1 wherein,
   in transmit mode, the selectable power feed, responsive to the transmit/receive control signal, couples a first voltage to the shared transmit/receive amplifier stage and the switched power feed, responsive to the transmit/receive control signal, decouples a second voltage from the shared transmit/receive amplifier stage; and,
   in receive mode, the switched power feed, responsive to the transmit/receive control signal, couples the second voltage to the shared transmit/receive amplifier stage and the selectable power feed, responsive to the transmit/receive control signal, couples a third voltage to the shared transmit/receive amplifier stage.

3. The apparatus of claim 2 wherein, in transmit mode, in response to the transmit/receive control signal, the first bias voltage is set to a first predetermined level, and in receive mode, in response to the transmit/receive control signal, the first bias voltage is set to a second predetermined level.

4. The apparatus of claim 3 wherein the shared transmit/receive amplifier stage comprises a first pair of transistors.

5. The apparatus of claim 4 wherein the transmit power amplifier stage comprises a second pair of transistors.

6. The apparatus of claim 5 wherein, in receive mode, the gates of the second pair of transistors is grounded.

7. The apparatus of claim 6 wherein the first pair of transistors are thick oxide input/output transistors and the second pair of transistors are thin oxide core transistors.

8. The apparatus of claim 4 wherein the transit amplifier stage comprises:
   a first transmit amplification stage that receives the transmit differential signal and produces an intermediate stage amplified transmit differential signal,
   a second transmit amplification stage that receives the intermediate stage amplified transmit differential signal and produces the first stage amplified transmit differential signal.

9. The apparatus of claim 8 further comprising:
   a second bias voltage coupled to the second transmit amplification stage, wherein, the second bias voltage, in transmit mode, in response to the transmit/receive control signal, is set to a third predetermined level, and wherein, the second bias voltage, in receive mode, in response to the transmit/receive control signal, is grounded.

10. The apparatus of claim 9 wherein the first transmit amplification stage comprises a second pair of transistors and the second transmit amplification stage comprises a third pair of transistors.

11. The apparatus of claim 10 wherein the first pair of transistors are thick oxide input/output transistors, the second pair of transistors are thin oxide core transistors, and the third pair of transistors are thin oxide core transistors.

12. A CMOS transceiver analog front end circuit comprising:
- a combined transmit and receive amplifier block that receives a transmit differential signal at a first pair of nodes and produces an amplified transmit differential signal at a second pair of nodes and that receives a receive differential signal at the second pair of nodes and produces an amplified receive differential signal at a third pair of nodes;
- an RF choke block coupled between the second pair of nodes and a pair of input/output nodes through which the amplified transmit differential signal and the receive differential signal couple to an antenna;
- a selectable power feed, responsive to a transmit/receive control signal, coupled to the RF choke block; and,
- a switched power feed, responsive to the transmit/receive control signal, coupled to the third pair of nodes.

13. The apparatus of claim 12 wherein the combined transmit and receive amplifier block comprises:
- a first amplifier that receives the transmit differential signal at the first pair of nodes and produces the amplified transmit differential signal at the second pair of nodes;
- a second amplifier that receives the receive differential signal at the second pair of nodes and produces the amplified receive differential signal at the third pair of nodes;
- a first bias voltage coupled to the first amplifier; and,
- a second bias voltage coupled to the second amplifier; wherein, in response to the transmit/receive control signal, in transmit mode, the first bias voltage is set to a first predetermined level and the second bias voltage is set to a second predetermined level; and wherein, in receive mode, in response to the transmit/receive control signal, the first bias voltage is grounded and the second bias voltage is set to a third predetermined level.

14. The apparatus of claim 13 wherein, in transmit mode, the selectable power feed, responsive to the transmit/receive control signal, couples a first voltage to the first amplifier, and the switched power feed, responsive to the transmit/receive control signal, decouples a second voltage from the second amplifier; and wherein, in receive mode, the selectable power feed, responsive to the transmit/receive control signal, couples a third voltage to the first amplifier, and the switched power feed, responsive to the transmit/receive control signal, couples the second voltage to the second amplifier.

15. The apparatus of claim 14 wherein the first amplifier comprises a first differential amplification stage that receives the transmit differential signal and produces a first stage amplified transmit differential signal; and a second differential amplification stage that receives the first stage amplified transmit differential signal and produces the amplified transmit differential signal; and the first bias voltage couples to the second differential amplification stage.

16. The apparatus of claim 15 wherein the first differential amplification stage comprises a first pair of transistors, the second differential amplification stage comprises a second pair of transistors, and the second amplifier comprises a third pair of transistors.

17. The apparatus of claim 16 wherein the first pair of transistors are thin oxide core transistors, the second pair of transistors are thick oxide input/output transistors and the third pair of transistors are thick oxide input/output transistors.

18. A CMOS transceiver analog front end circuit comprising:
- a combined transmit and receive amplifier block that receives a transmit differential signal at a first pair of nodes and produces an amplified transmit differential signal at a second pair of nodes and that receives a receive differential signal at the second pair of nodes and produces an amplified receive differential signal at a third pair of nodes;
- an RF choke block coupled between the second pair of nodes and a pair of input/output nodes through which the amplified transmit differential signal and the receive differential signal couple to an antenna; and
- a power feed coupled to the RF choke block.

19. The apparatus of claim 18 wherein the combined transmit and receive amplifier block comprises:
- a first amplifier that receives the transmit differential signal at the first pair of nodes and produces the amplified transmit differential signal at the second pair of nodes;
- a second amplifier that receives the receive differential signal at the second pair of nodes and produces the amplified receive differential signal at the third pair of nodes;
- a first bias voltage coupled to the first amplifier; and,
- a second bias voltage coupled to the second amplifier; wherein, in response to a transmit/receive control signal, in transmit mode, the first bias voltage is set to a first predetermined level and the second bias voltage is set to a second predetermined level; and wherein, in receive mode, in response to the transmit/receive control signal, the first bias voltage is grounded and the second bias voltage is set to a third predetermined level.

20. The apparatus of claim 19 wherein the first amplifier comprises a first differential amplification stage that receives the transmit differential signal and produces a first stage amplified transmit differential signal; and a second differential amplification stage that receives the first stage amplified transmit differential signal and produces the amplified transmit differential signal; and the first bias voltage couples to the second differential amplification stage.

21. The apparatus of claim 20 wherein the first differential amplification stage comprises a first pair of transistors, the second differential amplification stage comprises a second pair of transistors, and the second amplifier comprises a third pair of transistors.

22. The apparatus of claim 21 wherein the first pair of transistors are thin oxide core transistors, the second pair of transistors are thick oxide input/output transistors and the third pair of transistors are thick oxide input/output transistors.

* * * * *